United States Patent [19]

Hoffman

[11] 3,995,476
[45] Dec. 7, 1976

[54] MINIATURE BIAXIAL STRAIN TRANSDUCER

[75] Inventor: Ira S. Hoffman, Newport News, Va.

[73] Assignee: The United States of America as represented by the Administrator of the National Aeronautics and Space Administration, Washington, D.C.

[22] Filed: Dec. 30, 1975

[21] Appl. No.: 645,571

[52] U.S. Cl. .............................................. 73/133 R
[51] Int. Cl.² ......................................... G01L 1/22
[58] Field of Search ........ 73/88.5 R, 133 R, 141 A; 33/147 D, 148 D

[56] References Cited
UNITED STATES PATENTS

| 3,186,217 | 6/1965 | Pfann | 73/88.5 R |
| 3,853,000 | 12/1974 | Barnett et al. | 73/88.5 R |

Primary Examiner—Jerry W. Myracle
Attorney, Agent, or Firm—Howard J. Osborn; Wallace J. Nelson; John R. Manning

[57] ABSTRACT

A reusable miniature strain transducer for use in the measurement of static or quasi-static, high level, biaxial strain on the surface of test specimens or structures. Two cantilever arms, constructed by machining the material to appropriate flexibility, are self-aligning and constitute the transducing elements of the device. Used in conjunction with strain gages, the device enables testing beyond normal gage limits for high strains and number of load cycles. The device does not require conversion computations since the electrical output of the strain gages is directly proportional to the strain measured.

10 Claims, 4 Drawing Figures

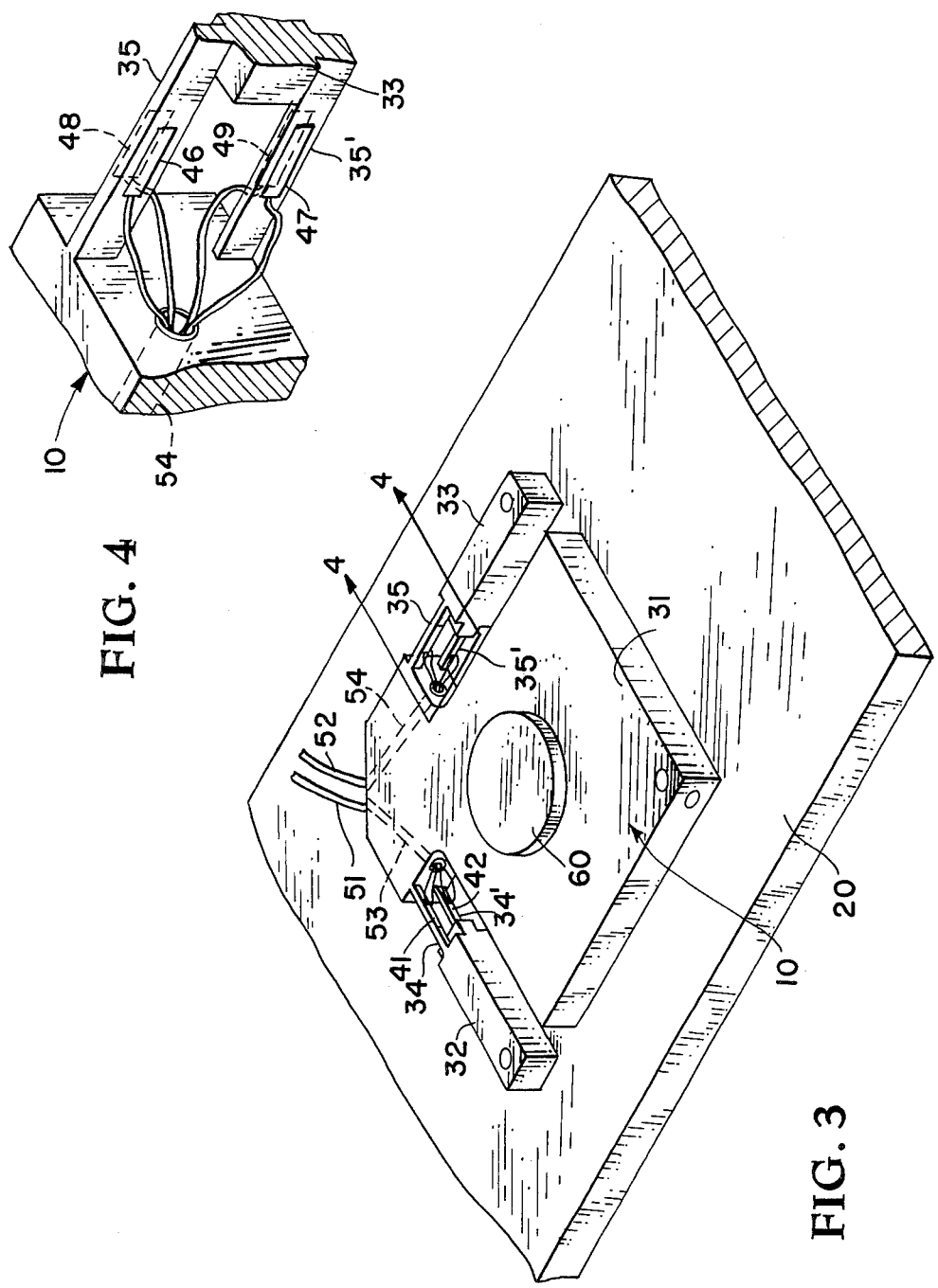

MINIATURE BIAXIAL STRAIN TRANSDUCER

ORIGIN OF THE INVENTION

The invention described herein was made by an employee of the United States Government and may be manufactured and used by or for the government for governmental purposes without payment of any royalties thereon or therefor.

BACKGROUND OF THE INVENTION

This invention relates generally to strain testing and more specifically to high level, biaxial strain testing of aerospace structural materials such as aluminum, titanium, boron-aluminum composites and the like, where long gage life and miniature size are desired.

The measurement of strain in the testing of materials, especially fatigue testing, requires gages that will measure high strain levels over many load cycles. The availability of a gage having such characteristics is further restricted where biaxial strain measurement is desired, and/or the principal strain axes are generally unknown and/or the surface area available for gage placement is restricted. Short gage length resistance type metal foil strain gages have been used in some applications but the considerable time and effort required for attachment and the inability to reuse the gages at other locations generally make them unsatisfactory where there is more than a single location of interest. A further disadvantage of this type of strain gage is that it is not capable of measuring large strains, in the 5% range for example, over a large number of load cycles. Mechanical extensometers, while possessing short gage lengths, are uniaxial in operation and, due to their overall size, are difficult to use in close proximity to one another for simultaneous biaxial measurements. There is therefore a definite need in the art for a device which will measure biaxial high level strain over many load cycles, which is small in size, easily affixed to the test specimen reusable, and eliminates the need for conversion computations to be performed on its output.

It is therefore an object of the present invention to provide a strain transducer which is capable of biaxial measurement of high level strain.

It is a further object of the present invention to provide a strain transducer which is reusable.

Another object of the present invention is to provide a strain transducer which by its relative size and weight lends itself to a variety of attachment methods.

An additional object of the present invention is to provide a strain transducer which provides output directly proportional to the strain measured, to thereby eliminate conversion computations.

SUMMARY OF THE INVENTION

These and other objects of the present invention are obtained by providing a strain transducer which minimizes the disadvantages of prior art strain measurement devices and offers a novel biaxial reusable miniature gage system producing output directly proportional to the strain measured.

Specifically, the present invention utilizes a triangular arrangement of three contact pins held in intimate contact with the surface of a test material. One of the contact pins is held rigidly while the second and third are held by separate cantilever arms. Conventional strain gages or other strain reading devices are attached, in a predetermined location, to each cantilever arm. The device may be attached or maintained in contact with the test material by a variety of methods examples of which would be elastic bands or dead weights.

As the surface of the test material elongates or shortens due to strain induced by forces applied to the test material, the contact pins will follow the material movements. When a contact pin held by a cantilever arm and the rigidly held contact pin are both positioned along the axis of movement, the contact pin held by the cantilever arm will move relative to the rigidly held contact pin. The relative movement of the contact pins causes the cantilever arm to deflect with the deflection thereof being sensed by the strain gages mounted upon a measurement area of the arm. Since strain level in the cantilever arm is controlled by conventional mechanical design considerations, the strain induced by the deflection of the cantilever arm is orders of magnitude lower than the actual strain at the surface of the test material. The strain gages thus operate well below their maximum strain levels and are therefor capable of reuse. By placing two strain gages on each side of the measurement areas of each cantilever arm, the strain gages lend themselves to a conventional full Wheatstone Bridge arrangement to produce a strain signal output for the cantilever arm directly proportional to the spacing between the pin attached thereto and the rigidly held contact pin.

BRIEF DESCRIPTION OF THE DRAWINGS

FIG. 3 is a perspective view of the present invention illustrating an alternate attachment between the strain transducer and test specimen; and FIG. 4 is an enlarged section taken along lines 4—4 of FIG. 3.

DETAILED DESCRIPTION

Figure 1:
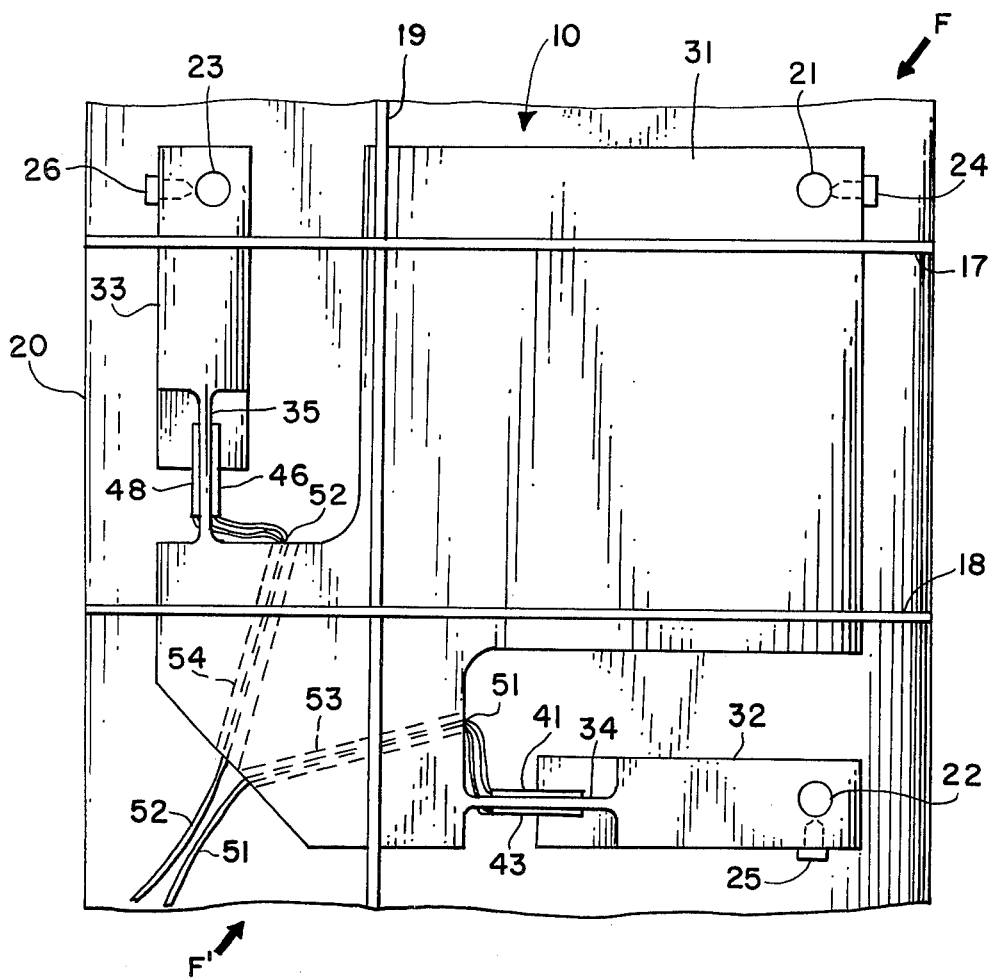
FIG. 1 is a top plan view of the preferred embodiment of the invention shown mounted on the surface of a test specimen.
Figure 2:
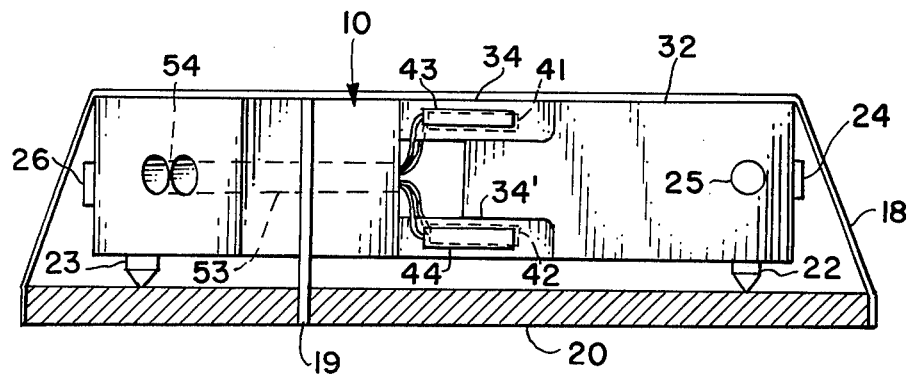
FIG. 2 is a side plan view of the preferred embodiment with the test speciment shown in section.

Referring now to the drawings and more particularly to FIGS. 1 and 2, the strain transducer of the present invention is generally designated by reference numeral 10 is shown in pressure contacting relationship with a test material 20 by way of three contact pins 21, 22 and 23 disposed in a right triangular configuration. Contact pins 21, 22 and 23 are provided with pointed tips to engage the surface of test material 20 such that when sufficient downward pressure is exerted on transducer 10 that relative movement between the pins and the surface is prevented. In the embodiment illustrated in FIGS. 1 and 2, this pressure is applied by elastic bands 17, 18 and 19 with secure transducer 10 to test material 20. As shown in the drawings, contact pin 21 is located at the vertex of the right angle formed by pins 21, 22 and 23 at a corner of a main body portion 31 of transducer 10 and maintained fixed relative thereto by a suitable set screw 24. Contact pins 22 and 23 are attached, respectively, to cantilever arms 32 and 33 by set screws 25 and 26. Set screws 24, 25 and 26 additionally control the extension of contact pins 21, 22 and 23 thereby causing the distance between transducer 10 and test material 20 to be variable. Cantilever arms 32 and 33 are disposed in mutually perpendicular relationship and are integral extensions of main body portion 31 and serve to limit flexure responses thereof to two separate strain axes.

Referring now to FIG. 3, an alternate system for maintaining strain transducer 10 fixed to a test material 20 is illustrated. In this embodiment the elastic bands are replaced by a single dead weight 60. Weight 60 is of sufficient mass to maintain contact pins 21, 22 and 23 fixed relative to the surface of test material 20.

As shown more particularly in FIG. 3 and 4, main body portion 31, cantilever arm 32 and cantilever arm 33 are not subassemblies which must be attached to one another. Rather, they are machined from a unitary block to the configuration shown resulting in a transducer body of one piece construction. Cantilever arm 33 is provided with a reduced diameter segment consisting of an upper element 35 and a lower element 35' which serve as the flexible areas of the arm. Conventional foil type strain gage 46 is attached by adhesive or other suitable conventional means to the inner surface of upper element 35 while a second conventional foil type strain gage 48 (shown in phantom) is attached to its outer surface. Conventional foil type strain gage 47 is identically attached to the inner surface of lower element 35' while a second conventional foil type strain gage 49 (shown in phantom) is attached to its outer surface. Conventional foil type strain gage 47 is identically attached to the inner surface of lower element 35' while a second conventional foil type strain gage 49 (shown in phantom) is attached to its outer surface. Output wires of strain gages form wire bundle 52 which passes through channel 54 of main body portion 31 to connect with a conventional Wheatstone Bridge type receiving circuit (not shown).

Cantilever arm 32 is of identical construction. Cantilever arm 32 is provided with a reduced diameter segment consisting of an upper element 34 and a lower element 34' which serve as the flexible areas of the arm. Conventional foil type strain gage 41 is attached by adhesive or other suitable conventional means to the inner surface of upper element 34 while a second conventional foil type strain gage 43 (FIG. 2) is attached to the outer surface. Conventional foil type strain gage 42 is identically attached to the inner surface of lower element 34' while a second conventional foil type strain gage 44 (FIG. 2) is attached to its outer surface. Output wires of the strain gages form wire bundle 51 which passes through channel 53 of main body portion 31 to connect with a conventional Wheatstone Bridge type receiving circuit (not shown).

The preferred specific embodiments illustrated possess a gage length of 1 inch, an overall length of 1.15 inches and a thickness of 0.25 inches. The configuration shown was machined from a single piece of 17-4 PH steel, having a Rockwell Hardness of 40–42, with the exception of the contact pins 21, 22 and 23 and their set screws 24, 25 and 26 which were machined from hard steel. Total weight of the transducer is approximately 10 grams.

OPERATION

In operation, cantilever arms 32 and 33 are positioned perpendicular to the principle strain axes of the surface of the test material 20 on which biaxial strain measurements are to be made. Contact pins 21, 22 and 23 are then maintained in intimate contact with the surface of test material 20 by application of elastic bands 17, 18 and 19 shown in FIG. 1 or the dead weight 60 disposed against the strain transducer 10 as shown in FIG. 3. Contact pins 22 and 23, affixed to cantilever arms 32 and 33 respectively, form measurement pairs with contact pin 21.

Application of forces F and F', as shown in FIG. 1, against test material 20, normal to its surface, create a state of compression in the test material. By reversal of the force directions, tensile stress is created. Depending upon the structure of the test material, application of such force pairs can cause the surface of test material 20 to widen along one principle strain axis and narrow along the other axis, or widen along both principle strain axes, or narrow along both principle strain axes. Contact pins 21, 22 and 23 follow any movement of the surface of the test material 20 so that pin separation between a measurement pair directly reflects widening or narrowing of the surface. With pin 21 held rigid by main body portion 31, pin separation must occur by relative movement of either pin 22 or 23 which causes deflection of cantilever arm 32 or 33, respectively, in their reduced diameter segments.

Assuming that pin separation increases between pin 21 and 22, cantilever arm 32 is deflected in an outward direction as shown in FIG. 1. Such deflection is sensed by strain gages 41, 42, 43, and 44. Strain gages 41 and 42, being disposed on the inner surfaces of upper element 34 and lower element 34', respectively, sense tension while strain gages 43 and 44, being disposed on the outer surfaces of upper element 34 and lower element 34', respectively, sense compression. Strain gage output is carried by output wire bundle 51 to a Wheatstone Bridge type receiving circuit, not shown, to provide a strain response.

Assuming that pin separation decreases between pin 21 and 22, cantilever arm 32 is deflected in an inward direction. Such deflection is sensed by strain gages 41, 42, 43, and 44. Strain gages 41 and 42, being disposed on the inner surfaces of upper element 34 and lower element 34', respectively, sense compression while strain gages 43 and 44, being disposed on the outer surfaces of upper element 34 and lower element 34', respectively, sense tension. Strain gage output is carried by output bundle 51 to a Wheatstone Bridge type receiving circuit, not shown, to provide a strain response.

Assuming that pin separation increases between pin 21 and 23, cantilever arm 33 is deflected in an outward direction. Such deflection is sensed by strain gages 46, 47, 48 and 49. Strain gages 46 and 47, being disposed on the inner surfaces of upper element 35 and lower element 35', respectively. sense tension while strain gages 48 and 49, being disposed on the other surfaces of upper element 35 and lower element 35', respectively, sense compression. Strain gage output is carried by output bundle 52 to a Wheatstone Bridge type receiving circuit, not shown, to provide a strain response.

Assuming that pin separation decreases between pin 21 and 23, cantilever arm 33 is deflected in an inward direction. Such deflection is sensed by strain gages 46, 47, 48 and 49. Strain gages 46 and 47, being disposed on the outer surfaces of upper element 35 and lower element 35', respectively, sense compression while strain gages 48 and 49, being disposed on the outer surfaces of upper element 35 and lower element 35', respectively, sense tension. Strain gage output is carried by output bundle 52 to a Wheatstone Bridge type receiving circuit, not shown, to provide a strain response. Pin spacing versus strain gage output calibrations are made to accurately establish the relationship of the strain signal to actual strain. Thus, once this relationship is established, because the response is directly proportional to actual strain, no further conversion computations are required with respect to the data obtained from the gages.

The level of strain measured upon cantilever arms 32 and 33, while directly proportional to the actual strain on test specimen 10, is of such lesser magnitude that strain gages 41, 42, 43, 44, 46, 47 and 49 can serve for an unlimited number of load cycles over a measurement range of up to 5% strain in the test material. Furthermore, since strain transducer 10 is not adhesively affixed to test specimen 20 it may simply be moved to a subsequent location on the test specimen and, upon reapplication of elastic bands 17, 18 and 19 or dead weight 60, is available for data collection at that location.

Although the test material used in the specific embodiment described was aluminum plate, any material that can be utilized in aircraft or other aerospace structures such as titanium and boron-aluminum composites and the like may be tested as well.

It is to be understood that the forms of the invention shown are merely preferred embodiments and various changes can be made in the shape, size, and the arrangements of the parts as will be readily apparent to those skilled in the art. Also, equivalent means may be substituted for those described and certain features may be used independently from other features described herein without departing from the spirit and scope of the invention.

What is claimed as new and desired to be secured by letters patent of the United States is:

1. Apparatus for measurement of surface strain on a test specimen in two directions comprising in combination:
   a. a test specimen having a surface adapted for strain testing,
   b. a strain transducer assembly for measurement of surface strain on said test specimen when said test specimen is subjected to controlled tensile and compression forces, and
   c. means for maintaining said strain transducer fixed relative to the test surface of said test specimen,
   said transducer assembly including
   a main body portion and two cantilever arms integrally secured in mutually perpendicular relationship to said main body portion,
   each said cantilever arm being provided with an integrally attached contact pin extending perpendicularly from the free end thereof,
   an additional contact pin integrally attached to and extending perpendicular from said main body portion,
   said additional contact pin being positioned so as to be located at the vertex of a right angle formed by the positioning of the contact pins,
   each of said cantilever arms being provided with reduced diameter portions in an area thereof adjacent said main body portion,
   strain sensing means secured to the reduced diameter portion of each said cantilever arm and in electrical connection with an electrical circuit for measuring the strain sensed thereby when said test specimen is subjected to tensile and compression forces,
   whereby when said test specimen is subjected to a tensile or compression force said cantilever arms and the integrally attached contact points thereof will move with the surface of said test specimen relative to the contact pin attached to said main body portion of said transducer such that said cantilever arms flex in the reduced diameter portions thereof with this flexing being measured by said strain sensing means as a function of the strain being applied to said test specimen.

2. The apparatus of claim 1 wherein said means for maintaining said strain transducer fixed relative to the test surface of said test specimen comprises a plurality of elastic bands extending over said strain transducer and engaging said test specimen so as to exert a compression force on said transducer and said test specimen.

3. The apparatus of claim 1 wherein said means for maintaining said strain transducer fixed relative to the test surface of said test specimen comprises a dead weight positioned on said main body portion of said transducer.

4. The apparatus of claim 1 wherein said main body portion is provided with channels leading from an area adjacent the reduced diameter portion of each said cantilever arm with a bundle of electrical leads extending through said channels to connect said strain sensing means with the electrical circuit for measuring the strain sensed by said strain sensing means.

5. The apparatus of claim 1 wherein each of said contact pins is provided with pointed tip segments to assist in the engagement thereof with said test surface.

6. The apparatus of claim 1 wherein said strain sensing means include four short gage length resistance type metal foil strain gages disposed on each of said cantilever arms at the reduced diameter portions thereof.

7. The apparatus of claim 6 wherein said four strain gages are disposed in pairs with one of said pair serving to measure tensile strain in said cantilever arm and the other of said pair serving to measure compression strain in said cantilever arm.

8. The apparatus of claim 7 including a pair of channels formed in said main body portion, one of said channels extending from an area adjacent the reduced diameter portion of each said cantilever arm and said channels terminating at an essentially common area on the exterior of said main body portion to thereby serve as a conduit for electric lead wires extending from each of said strain gages to an electrical circuit for measuring the strain sensed by said strain sensing means.

9. The apparatus of claim 1 wherein each of said contact pins is secured to said main body portion and said cantilever arms by individual set screws extending through said main body portion and said cantilever arms, respectively, to thereby rigidly secure said pins in position and to permit individual adjustment of the length of said contact pins.

10. The apparatus of claim 1 wherein said main body portion and said two cantilever arms are formed of a unitary structure and said reduced diameter portion of said cantilever arms includes a pair of spaced portions extending from said main body portion to each said cantilever arm.

* * * * *